Figure 1:
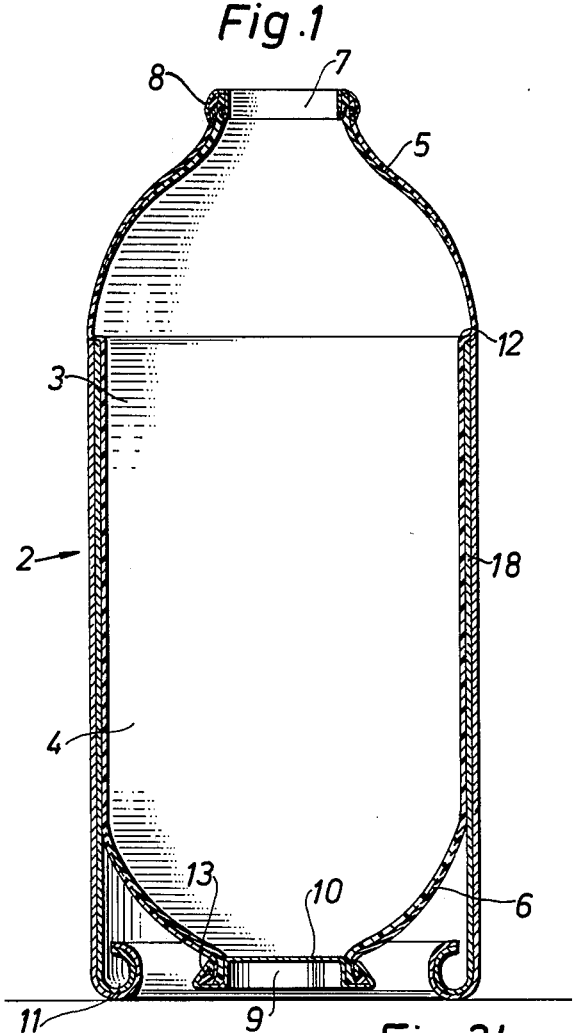

United States Patent [19]

Ignell

[11] 4,281,769

[45] Aug. 4, 1981

[54] PACKING CONTAINER

[75] Inventor: Rolf L. Ignell, Grilly, France

[73] Assignee: Tetra Pak Developpement SA, Pully-Lausanne, Switzerland

[21] Appl. No.: 64,920

[22] Filed: Aug. 8, 1979

[30] Foreign Application Priority Data

Aug. 11, 1978 [SE] Sweden .............................. 7808571

[51] Int. Cl.³ .............................................. B65D 6/30
[52] U.S. Cl. .................................. 215/12 R; 215/1 C
[58] Field of Search ............. 215/12 R, 1 C; 220/430, 220/453; 229/5.6

[56] References Cited

U.S. PATENT DOCUMENTS

| | | | |
|---|---|---|---|
| 2,110,612 | 3/1938 | Skinner | 220/430 |
| 2,775,384 | 12/1956 | Bergstrom | 220/453 X |
| 2,837,245 | 6/1958 | Grebowiec | 215/1 C X |
| 3,325,030 | 6/1967 | Rausing et al. | 215/1 C X |
| 3,457,337 | 7/1969 | Turner | 215/12 R UX |
| 3,578,524 | 5/1971 | Ignell | 220/430 X |
| 3,580,464 | 5/1971 | Griffith | 229/5.6 |
| 3,848,760 | 11/1974 | Rausing | 215/12 R |

FOREIGN PATENT DOCUMENTS 1209876  9/1959  France ...................................... 229/5.6

*Primary Examiner*—Donald F. Norton
*Attorney, Agent, or Firm*—Burns, Doane, Swecker & Mathis

[57] ABSTRACT

A packing container with an expanded tubular member is disclosed. The member has a central cylindrical portion and dished end portions. A first of said end portions includes an end wall and a second of said end portions includes an edge ferrule.

10 Claims, 6 Drawing Figures

PACKING CONTAINER

The present invention relates to a packing container. The packing container consisting of an inner container body of plastic material and an outer rigid casing of a material of only slight extensibility.

It has long been a desirable object to replace glass bottles by lighter and cheaper containers of plastic material, and this has taken place on a large scale. One of the problems, especially in the packaging of pressurized liquids, e.g. beer or carbonated beverages, has been making the packing material so gas-tight that the carbon dioxide dissolved in the liquid, e.g. the beer, cannot diffuse out through the package wall, and neither should it be possible for atmospheric oxygen to diffuse in through the package wall, since oxygen gas generally has an oxidizing effect, and causes a deterioration of the flavor of e.g. beer. A further demand on a packing container for pressurized liquids is that the container should be able to absorb any stresses originating from the contents while at the same time the wall of the plastic containers should be thin so as to allow the packing container to be light and inexpensive.

It has previously been proposed to solve this problem by a thin plastic container comprising a cylindrical shell part and two conical or dished end portions is manufactured from a thin plastic material. The cylindrical shell part is surrounded by a relatively rigid pressure-absorbing casing of e.g. paper which extends past one of the end parts, while the other end part objects from the casing and is provided with an emptying opening. These packing containers have been manufactured from a relatively gas-tight packing substance such as acrylonitrile material which is marketed under the trade name BAREX, and the inner plastic parts has been manufactured from two separate deep-drawn parts which are welded together along a joint flange. It is also known that bottle-shaped packages can be blow moulded by a process wherein a seamless tube is first extruded which is enclosed in a moulding cavity wherein the extruded plastic tube is then inflated to make contact with the inside of the moulding cavity.

The abovementioned methods for the manufacture of containers of plastic material for pressurized contents have proven relatively expensive and slow, so that a new method and a packing container in accordance with the invention provides certain advantages.

In accordance with the invention a seamless tube blank of the said plastic material with a wall thickness which is greater than the wall thickness of the final packing container is manufactured. One end of the said tube blank is provided with an end wall covering the tube end, the edge region of which end wall is joined to the edge region of the said tube end, and the other end of the said tube blank is provided with an annular edge ferrule which is joined to the edge region of the other tube end. The tube blank is heated to softening and is expanded in a moulding space by means of a pressurized gas through the tube end provided with the edge ferrule in such a manner, that the outside of the expanded tube blank will make contact with the inside of the moulding space. It is the characteristic of the packing container that the container body formed through expansion of the tube blank comprises a central, preferably cylindrical portion and two dished end parts located on either side of the said cylindrical portion, said end parts terminate in an end wall and in an edge ferrule respectively, the said cylindrical part being surrounded by a pressure-absorbing outer casing which extends past the end part provided with end wall.

Figure 2:
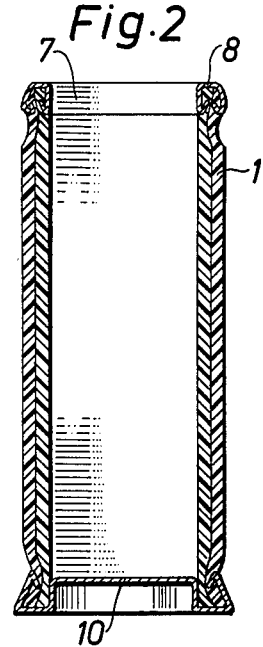
Figure 3A:
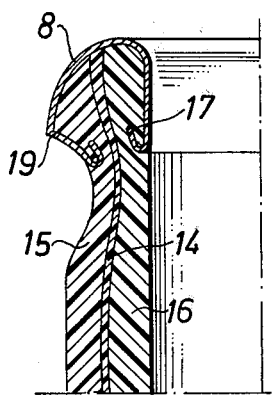
Figure 3B:
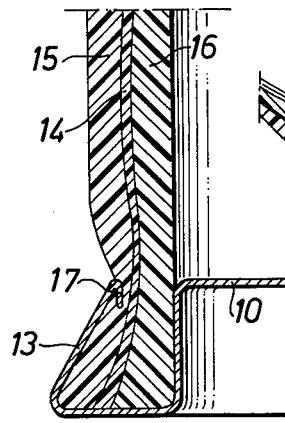
Figure 4A:
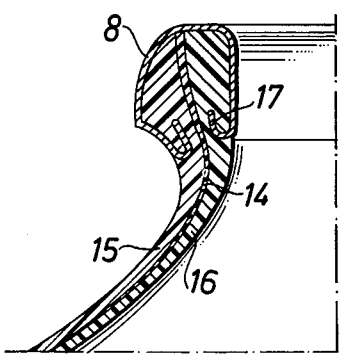
Figure 4B:
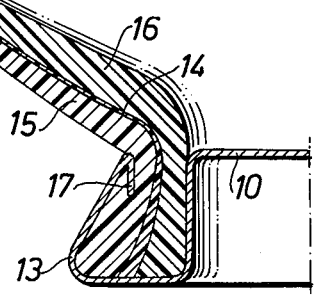

A preferred embodiment of the invention will be described in the following with reference to the enclosed schematic drawing, wherein FIG. 1 presents a cross-section through a packing container in accordance with the invention, FIG. 2 is a cross-section of a tubular blank for the manufacture of the inner plastic part of the packing container, FIGS. 3a and 3b show an enlarged section of the upper and lower parts respectively of the said tube blank, and FIGS. 4a and 4b show an enlarged section of the upper and lower parts respectively of the plastic container body manufactured from the tube blank to form the packing container in accordance with the invention.

The packing container 2 shown in FIG. 1 consists of an inner package body 3 of plastic material. The package body comprises a central, cylindrical shell part which is joined on either side to substantially dished end parts 5, 6. The said dished end parts 5, 6 comprise first and second openings 7, 9. The second opening 9 is closed permanently by an end plate 10 which preferably can be made of metal but also of a plastic material which is inherently more stable and has a higher melting point than the material of the packing container body 3. The end plate 10 is fixed to the end part 6 of the container body 3 along the edge region of the opening 9 such that the edge region of the end wall 10 is joined by means of folding to the edge region of the end part 6.

The opening 7 of the end part 5 has along its edge region an edge ferrule 8 which preferably is made of the same material as the end plate 10 and which is joined to the edge region of the opening 7 by folding in such a manner that the edge ferrule will form the emptying opening 7 of the container part 3.

The container body 3 of plastic material is surrounded by an outer casing 18, preferably made of a non-extensible material, e.g. paper, which surrounds the cylindrical portion 4 of the packing container 3 in a tight fit and accommodates within it the end part 6, while the end part 5 which comprises the emptying opening 7 projects from the casing 18. The container body 3 comprises a "step" 12 where the container body 3 is provided with a sudden widening, i.e., the cylindrical part 4 has an outside diameter smaller than the diameter of the adjoining part of the outer end part 5. The said "step" 12 forms an edge against which the top cut edge is protectively covered by the projecting edge formed by the step 12 also the said projecting edge helps to fix the position of the casing 18. The projecting edge formed by the step 12 preferably should have the same width as the thickness of the casing 18. The casing 18 which is most frequently made of paper, cardboard or some other liquid-absorbing material, preferably can be provided with an outer plastic coating which protects it against liquid absorption, and with an edge roll 11 at the bottom. The edge roll is intended to prevent the casing from making direct contact with liquid if the packing container 2 is placed onto a moist base. The casing 18, whose purpose it is to absorb stresses originating from the contents, also acts as a supporting surface for the packing container.

In the manufacture of the packing container in accordance with FIG. 1, first a tube blank in accordance with FIG. 2 is made. The said tube blank preferably can be manufactured by extrusion, and if it is desired to manufacture the container body of the packing container from a laminate comprising a number of layers of different plastic materials the tube blank can, in accordance with FIG. 2, be produced by means of co-extrusion, that is to say, simultaneous extrusion of several plastic materials, so that the tube blank will comprise concentric layers of plastic material. The extruded tube blank 1 has a thickness which exceeds the thickness of the container body of the finished packing container and, as can be seen from FIG. 2, may be made considerably shorter than the container body so as to be stretched subsequently to obtain molecular orientation, which substantially improves the mechanical properties and strength characteristics in the direction of orientation of the material. It is also possible, however, in the manufacture of the packing container to start from the tube blanks which have been stretched and oriented in conjunction with the extrusion and which will then have a length which coincides with the height or the length of the container body 3. Regardless of whether the tube blank 1 has been stretched in conjunction with the extrusion process or in a separate operation after the extrusion, the tube blank is provided with an end plate 10 which closes one end of the tube blank, and an edge ferrule 25 which embraces and covers in a protective manner the corresponding end of the tube blank 1.

In FIG. 3a an enlargement of the upper part of the tube blank in accordance with FIG. 2 is shown in section, and, as can be seen from FIG. 3a, the packing material in the case described here consists of three material layers, namely a central material layer consisting of polyvinyl alcohol, or ethylvinyl alcohol of the type which is marketed under the trade name EVAL. This central layer 14, which has very favourable gas barrier properties, is covered on either side by other plastic material, since it has been found that the gas barrier properties of the said material drastically deteriorate if the material comes into contact with water or with a moist medium. To protect the central layer 14 from coming into contact with water or moisture the same is surrounded therefore on either side by plastic layers 15, 16 which may consist of polypropylene, polyvinyl chloride, polyester or similar material. The above-mentioned materials cannot be laminated directly with polyvinyl alcohol or EVAL, but special binder layers have to be introduced between the plastic layers which offer adhesion with the central layer 14 as well as with the outer layers 15 and 16. In the case described here the said binder layers may be used if desired, but, since this makes the material more expensive, it may be dispensed with in the present case, since the material layers in the tube blank 1 are effectively held together by means of the end plate 10 and the edge ferrule 8, so that it is not absolutely essential for the material layers 14, 15 and 16 to be adhering to each other. In FIG. 3a the edge ferrule 8 is bent over the upper end edge region of the tube blank 1 and is anchored in the plastic material by means of folding, the folding edges 17 being pressed into the plastic material. The edge ferrule 8 comprises moreover an arrangement 18 for the fixing of a cap over the emptying opening 7 of the packing container 2. The arrangement 18 for the application of the cap can be also in the form of a screw thread, which fits into a corresponding screw thread arranged in the cap part.

In FIG. 3b the corresponding end of the tube blank 1 is shown. The bottom opening of the tube blank 1 being completely covered by an end plate 10 which together with the bottom part of the tube blank has been folded by means of the end plate 10 having been provided with a U-shaped groove which accommodates the bottom part of the tube blank 1. When the end plate 10 and the bottom part of the tube blank 1 are folded together the end plate 10 is anchored in the plastic material of the tube blank by means of specially arranged anchoring elements 17.

The manufacture of the container body 3 of the packing container 2 starts with the tube blank 1 provided with edge ferrule 8 and end plate 10 having in accordance with FIG. 2. The tube blank 1 is first stretched so that its length corresponds to the length of the container body 3 at the same time as the plastic material is molecular-oriented so as to obtain improved material properties. As mentioned earlier, the orientation process may also be carried out in conjunction with the extrusion, and in this case the end plate 10 and the edge ferrule 8 are applied to the already molecular-oriented tube blank 1.

The tube blank 1, so-prepared, is heated to such an extent that the plastic material softens and can be subjected to a plastic moulding process. When the tube blank 1 has been heated to the required extent it is enclosed in a mould (not shown here) consisting of two or more parts which together represent a moulding cavity, the inner contour of which corresponds to the outer contour of the desired container body 3. The heated tube blank 1 introduced into the cavity so formed is fixed at its ends and a pressurized gas is fed through the opening 7, whereupon the walls of the tube blank expand and are extended with simultaneous reduction in thickness. The expansion of the tube blank is continued until the container body 3 formed from the tube blank has been forced into complete contact with the inner surface of the moulding cavity, whereupon the mould portions forming the said moulding cavity are separated again and the container body 3 formed is allowed to stabilize through cooling. It is possible to enhance the moulding action by pressurized gas, preferably compressed air, is fed through the opening 7 of the tube blank, and by connecting, in addition, the walls of the moulding cavity to a vacuum source in order to improve the contact of the plastic material with the walls of the moulding cavity.

The container body 3 obtained by blow moulding is then combined with an outer casing 18 produced in a separate manufacturing operation, which may be made for example by winding a paper material around a mandrel, the overlapping layers of paper being glued to one another by means of a suitable adhesive.

With the help of the method in accordance with the invention the normal mould blowing process for the manufacture of packing containers is made substantially more effective and less costly, especially because the actual moulding operation is separated from the manufacture of the tube blank which may be defined as a semi-finished product from which the finished container body is made. It is possible, therefore, to manufacture tube blanks with their edge ferrules and base plates separately from the container moulding. This also means that at the place where the container moulding is to take place no extruders for the manufacture of the tube blanks are required and since such extruders are expensive and require skilled operators for their handling, it is very advantageous to separate the blank production from the container production. Moreover, it has been found to be very important to have full freedom in the design of the edge ferrule 8, since the packing container can then readily be adapted to different types of closing caps.

I claim:

1. A packing container comprising:
   an expanded tubular member having a central cylindrical portion and dished first and second end portions on respective ends of said cylindrical portion, wherein said tubular member is comprised of a laminate which includes a gas barrier layer and at least one additional layer;
   an end plate, said end plate having an edge groove, which edge groove receives said first end portion of said tubular member such that said end plate closes said tubular member at said first end thereof; and
   an edge ferrule which receives said second end portion of said tubular member.

2. The packing container according to claim 1 wherein said tubular member is oriented in its longitudinal direction and comprises a plurality of different plastic materials.

3. The packing container according to claim 1 wherein said edge ferrule is joined to said tubular member by means of folding.

4. The packing container of claim 1 wherein said tubular member is comprised of a laminate which includes a layer selected from the group consisting of polyvinyl alcohol and ethylvinyl alcohol and at least one additional layer selected from the group consisting of polypropylene, polyvinylchloride and a polyester.

5. The packing container of claim 1 wherein said edge ferrule is shaped to receive a closure cap.

6. The packing container of claim 1 further comprising an outer cylindrical casing surrounding at least a portion of said tubular member.

7. The packing container of claim 6 wherein said outer cylindrical casing surrounds said first end portion and said cylindrical portion.

8. The packing container of claim 7 further including a step-like boundary between said second end portion and said cylindrical portion with said step-like boundary abutting said cylindrical casing.

9. The packing container of claim 1 wherein said plate is a metal plate.

10. The packing container of claim 1 wherein said plate is a plastic plate.

* * * * *